(No Model.) 4 Sheets—Sheet 1.
W. BAUSCH.
LENS GRINDING MACHINE.

No. 445,349. Patented Jan. 27, 1891.

Witnesses:
N. W. Mortimer
N. R. Kennedy

Inventor:
William Bausch
By his Attorney,
Phil. T. Dodge (No Model.) 4 Sheets—Sheet 2.
W. BAUSCH.
LENS GRINDING MACHINE.

No. 445,349. Patented Jan. 27, 1891.

on line x-x

Witnesses:
N. W. Mortimer
William Kennedy

Inventor:
William Bausch
By his Atty
Phil. T. Dodge (No Model.) 4 Sheets—Sheet 3.
W. BAUSCH.
LENS GRINDING MACHINE.
No. 445,349. Patented Jan. 27, 1891.
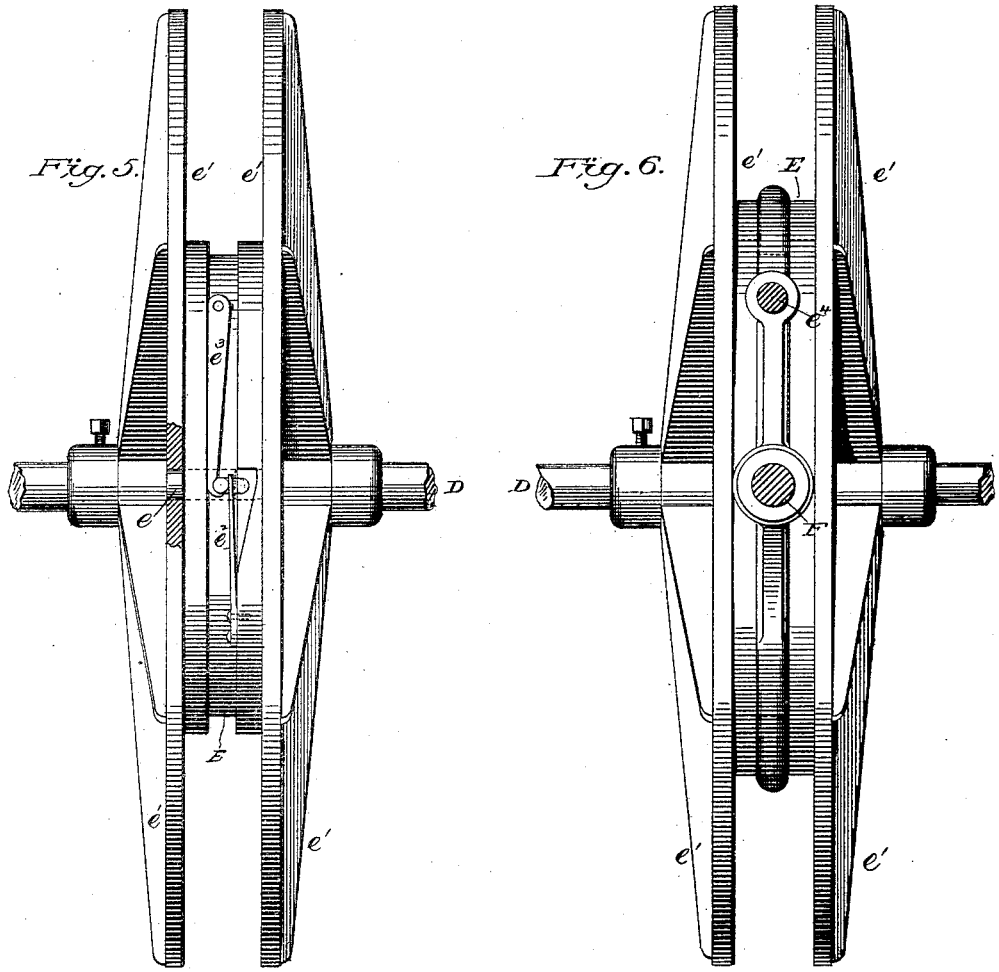
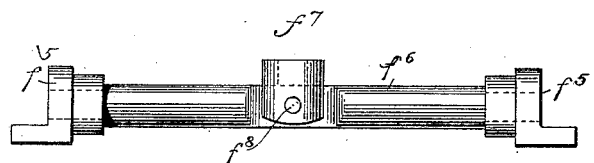
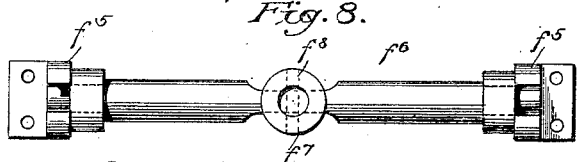
Witnesses:
Inventor:
William Bausch
By his Atty
Phil. T. Dodge
THE NORRIS PETERS CO., PHOTO-LITHO., WASHINGTON, D. C.

(No Model.) 4 Sheets—Sheet 4.

W. BAUSCH.
LENS GRINDING MACHINE.

No. 445,349. Patented Jan. 27, 1891.

Witnesses:

Inventor:
William Bausch
By Phil. T. Dodge Atty

UNITED STATES PATENT OFFICE.

WILLIAM BAUSCH, OF ROCHESTER, NEW YORK.

LENS-GRINDING MACHINE.

SPECIFICATION forming part of Letters Patent No. 445,349, dated January 27, 1891.

Application filed February 14, 1890. Serial No. 340,422. (No model.)

*To all whom it may concern:*

Be it known that I, WILLIAM BAUSCH, of Rochester, in the county of Monroe and State of New York, have invented certain Improvements in Lens-Grinding Machines, of which the following is a specification.

The aim of the invention is to provide a simple machine for grinding and polishing cylindrical lenses—that is to say, lenses having either or both surfaces segments of cylinders; and to this end it consists in combining, with a cylindrical block or support for the lenses, a corresponding grinding-shell, the two having complementary cylindrical surfaces and mechanism by which the shell is reciprocated endwise and also rocked laterally, so that it pursues a constantly-changing path in its course to and fro over the lenses.

Figure 1:
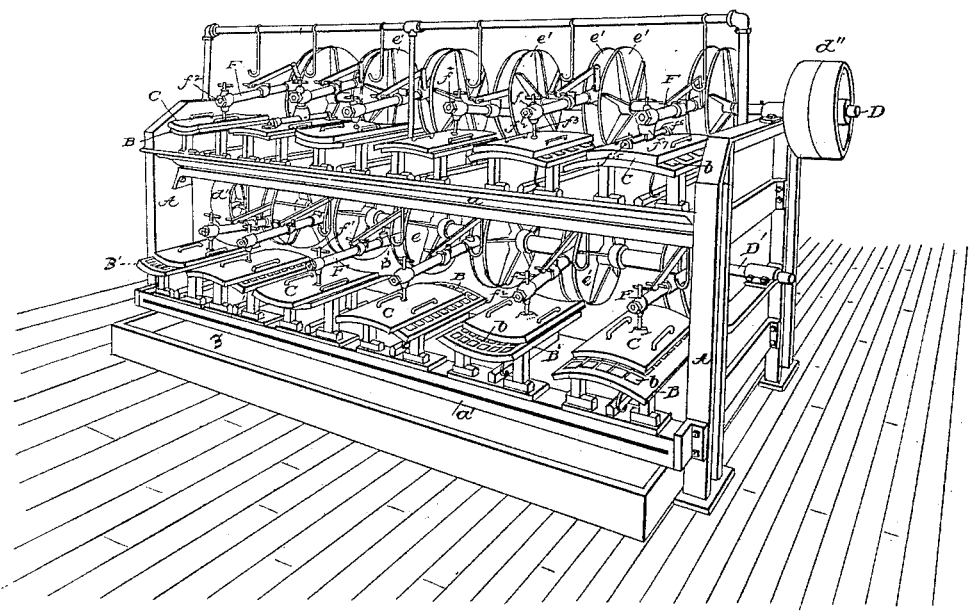
Figure 2:
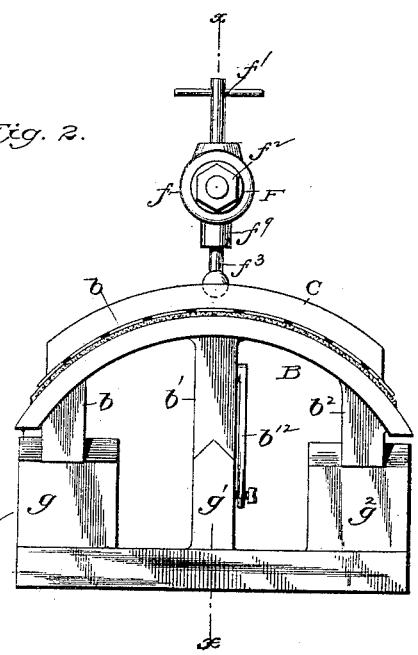
Figure 3:
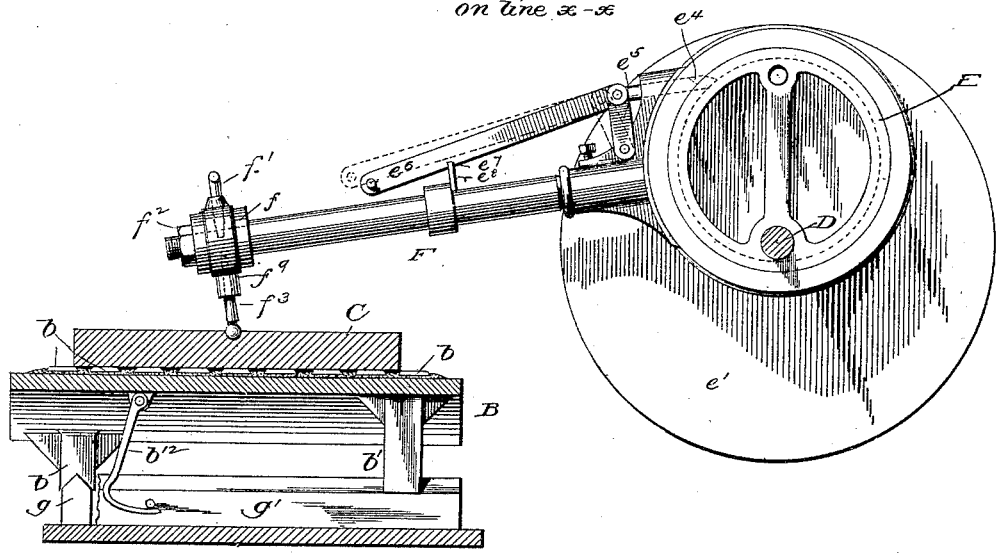
Figure 4:
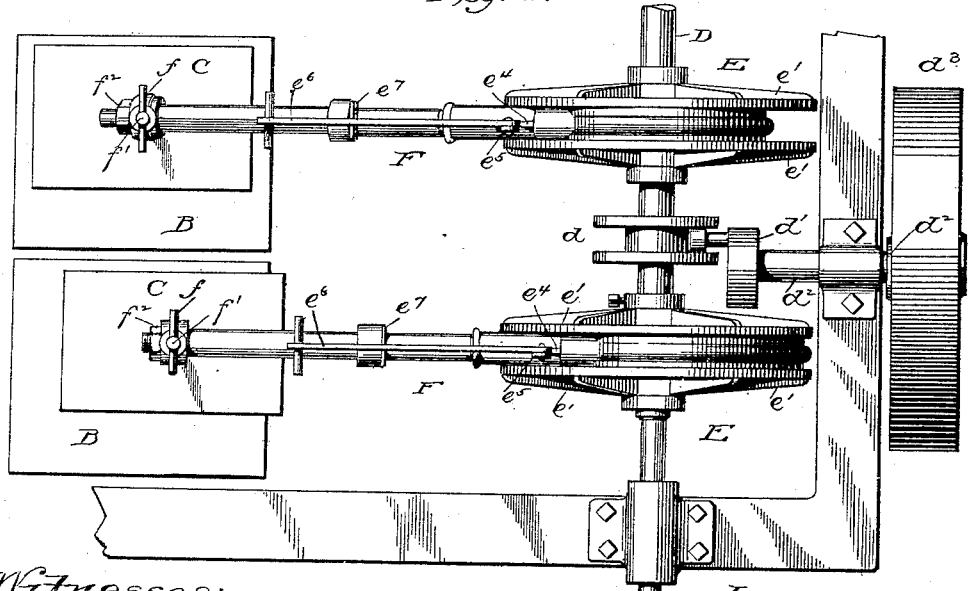
Figure 9:
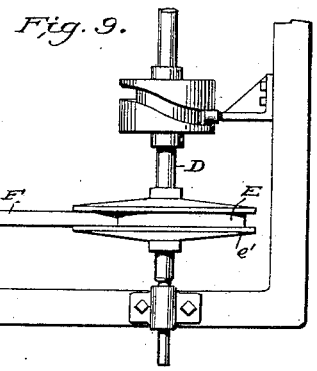
Figure 10:
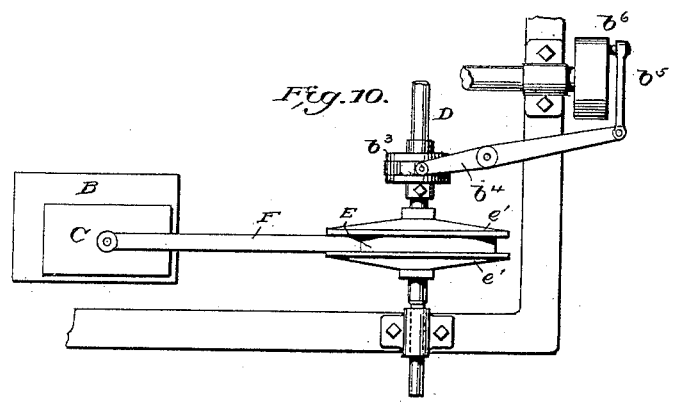
Figure 11:
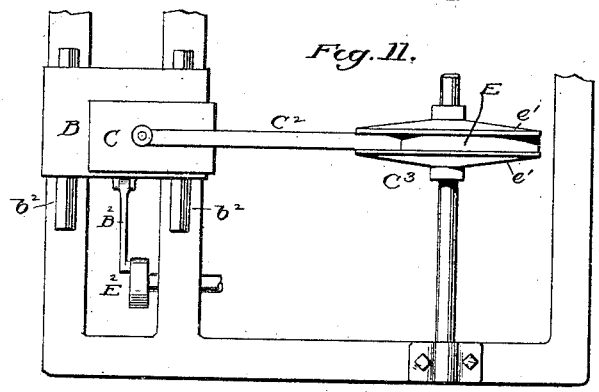

In the accompanying drawings, Figure 1 is a perspective view of a machine constructed on my plan and containing a series of blocks and rubbers. Fig. 2 is an end elevation showing one of the lens-supporting blocks, the grinding-shell thereover, and a pitman for moving the latter. Fig. 3 is a vertical section on the line $x\ x$ of Fig. 2 of the parts therein shown and also through the pitman and eccentric-gear for moving the grinding-shell. Fig. 4 is a diagram illustrating in plan view the parts shown in Fig. 3. Fig. 5 is an edge view of one of the eccentrics, showing the stop devices therein. Fig. 6 is an edge view showing the eccentric-strap on the outside. Figs. 7 and 8 are respectively a side view and a top plan view of pitman-connections used when the shell has a curvature of long radius. Figs. 9, 10, and 11 are views of the parts in modified forms.

Referring to the drawings, A represents a rigid main frame containing two horizontal decks or platforms $a$ and $a'$, intended to sustain the grinding devices.

B B' represent blocks the surfaces of which are segments of cylinders. They are made of cast-iron or other suitable material adapted to have the blank lenses $b$ cemented to their faces, and they are secured in position on the decks of the main frame, as shown in the drawings, and hereinafter described in detail. The upper operative faces of these blocks are made of concave or convex form in cross-section, according to the character of the lenses to be ground. Blocks of both forms are shown in the drawings. Over each of these blocks, resting upon and supported by the lenses therein, is placed a grinding-shell C, usually of cast-iron. It is made of a size approximating that of the underlying block, and its under surface is of true cylindrical form, the radius of the curve being greater or less, according to the focal length of the lenses to be produced. The grinding of the lenses is effected by moving the shells endwise to and fro over the underlying lenses and at the same time vibrating them laterally, the surfaces being supplied with water or other fluid and with suitable abrasive material, as in ordinary lens-grinding.

For the purpose of imparting the requisite motion to the shells and of operating each shell independently of the others the following mechanism is used: Two shafts D D' are mounted horizontally in bearings in the main frame behind and somewhat above the respective decks. Each shaft is provided at the end with a driving-pulley $d''$ and mounted in its bearings so that it may rotate freely and at the same time move endwise, for a purpose which will presently appear. On each shaft opposite the respective shells is mounted a series of eccentrics E, carrying pitman F, the forward ends of which are connected to the respective shells by universal joints, so that as the eccentrics rotate they cause the pitmen to move the shells endwise. Each eccentric is embraced between two large disks $e'$, keyed firmly to the shaft and serving to support the eccentrics and pitmen against the lateral strains and maintain them in fixed relations to the shaft. Each of the main shafts D and D' is provided at any suitable point in its length with a grooved collar $d$ or its equivalent, which receives the wrist of a crank $d'$ on the end of a shaft $d^2$, provided with an independent drive-pulley $d^3$ and arranged in bearings in the frame at right angles to the main shaft. (See Fig. 4.) The crank-shaft, being independently rotated, acts to move the main shaft to and fro in an endwise direction, the result being that the pitmen of the main shaft will move laterally at the same time that they move endwise, whereby they are caused to impart a lateral as well as longitudinal motion to the shells C. The result of this compound movement is that the shells are moved through a constantly-changing circuitous path, each and every point in the shell being carried over the underlying lenses constantly and in a constantly-changing direction. The course thus pursued by a given point in the shell will be akin to that produced by what is known as a "geometric" or "engine" lathe. By changing the extent to which the pitmen are moved laterally in relation to the length of their stroke and by changing the relative speeds at which the main shafts and the crank-shafts are driven the course of movement of the shells may be greatly varied. The advantage of thus constantly changing the motion of the shells is twofold: first, that they are more certain to produce lenses of true cylindrical form, and, second, that the surfaces of the lenses are ground more smoothly and with higher finish than would be possible were the shells simply reciprocated in right lines.

When moved in accordance with the present invention, the shells do not leave any perceptible lines upon the faces of the lenses, and this because at each stroke the lines of the previous stroke are crossed.

The essence of the invention resides in combining with the shells means for moving them laterally and longitudinally in changing paths, and it is manifest that the details of construction may be variously modified without departing from the limits of the invention. It is preferred, however, to retain the details shown in the drawings, and which will now be described.

Each pitman is provided at its end with a strong head $f$, secured thereon by a tapered pin $f'$ and a nut $f^2$, and the lower side of this head is provided with a rigid tapered pin $f^3$, the lower end of which is made of spherical form and seated in a corresponding cavity in the top or back of the shell, as plainly shown in Fig. 3. This construction answers all purposes when the shells are of a curvature of short radius. In shells which are of more flattened form—that is, with curves of longer radius—it is preferred to provide them on the back with notched ears $f^5$, and to seat in these ears a rock-bar $f^6$, having at the middle a socket $f^7$, mounted on a transverse pivot $f^8$, and adapted to receive a neck $f^9$ on the lower end of the pitman-head, the pin $f^3$ being at such time removed.

The blocks which sustain the lenses are commonly made of cast-iron, and each provided with three supporting-feet $b$ $b'$ $b^2$, which are seated on V-shaped ribs $g$ $g'$ $g^2$, rising rigidly from a plate on the main frame. Two of these ribs lie transversely at the front, while the other, which is of greater length, lies longitudinally of the shell, thus facilitating the proper adjustment of the block, which requires to be frequently removed from the machine. The block is held down in place by a hook $b^{12}$ or equivalent fastening.

In order that the pitman and shells may be stopped independently of each other, so as to permit a removal of any one shell and block without stopping the machine, I provide means by which the eccentrics may be independently unlocked at will.

As shown in Fig. 5, each eccentric is mounted loosely on the shaft and driven by a transverse driving-pin $e$, mounted therein and engaging one of the side disks $e'$, keyed to the shaft. A spring $e^2$, fixed in the eccentric, acts at one end against a stud on the driving-pin and urges it endwise into engagement with the driving-disk, while a finger $e^3$, pivoted in the eccentric to swing laterally, bears against the stud on the opposite side to retract the driving-pin and unlock the eccentric. This finger is exposed in a circumferential groove in the eccentric. The end of the pitman encircling the eccentric, technically known as the "eccentric-strap," contains a sliding trip-pin $e^4$, the inner beveled end of which may be projected into the groove in the eccentric, while the outer end is pivoted to a sustaining-link $e^5$ and to an operating-handle $e^6$, which latter is extended along the pitman within convenient reach of the attendant and notched at $e^7$ to engage a locking-stud $e^8$ on the pitman. When the handle and the trip-pin $e^4$ are drawn forward, as shown in dotted lines in Fig. 3, the pin is inactive and the driving-pin remains in engagement, carrying the eccentric with the shaft. When, however, the handle is pushed rearward, the end of the trip-pin is thrust into the groove of the eccentric. As the latter revolves, its trip-finger $e^3$ rides against the end of the trip-pin $e^4$, which carries the finger to one side, thereby withdrawing the driving-pin $e$ from the disk. The eccentric is thus stopped and held at rest until the trip-pin is again drawn out of action by the handle.

It is to be understood that the described mechanism is in effect but a clutch for driving the eccentric, and that any ordinary clutch mechanism of appropriate form may be substituted therefor, or that the clutch mechanism may be omitted and the pitmen driven by eccentrics or cranks on the driving-shaft.

Instead of moving the driving-shaft endwise by cranks, as shown, they may each be moved by grooved eccentrics fixed thereon and engaging a roller on the frame, as shown in Fig. 9; or end motion may be imparted to the shaft by providing the same, as shown in Fig. 10, with a collar $b^3$, receiving one end of a lever $b^4$, the opposite end of which is connected by a pitman $b^5$ to a crank $b^6$ on an independently-driven shaft.

Instead of moving the pitman laterally to effect the rocking or rolling motion of the shells, the blocks on which the shells rest may receive a reciprocating motion at right angles to the line in which the pitmen reciprocate, in which case it will be unnecessary to move the pitmen laterally. Such arrangement is shown in Fig. 11, in which B represents the block mounted on guides $b^2$ and reciprocated transversely by the pitman $B^2$ and eccentric $E^2$, while C is the shell reciprocated in a right line by pitman $C^2$ and crank $C^3$ on a shaft which is without end motion.

I believe myself to be the first to combine, with a lens-block and grinding-shell adapted to grind cylindrical lenses, automatic mechanism for moving them in relation to each other so that the shell passes in a circulatory and constantly-changing course over the lenses, and it is to be distinctly understood that my invention includes any mechanism the mechanical equivalent of that herein shown, for the purpose named.

Having thus described my invention, what I claim is—

1. In a machine for grinding cylindrical lenses, the combination of a cylindrical block, a complementary cylindrical shell, and mechanism, substantially as shown, for producing simultaneously longitudinal and lateral reciprocation between said shell and block.

2. In a lens-grinding machine, the cylindrical lens-block, the complementary shell, the shell-operating pitman, its actuating crank or eccentric, and means, substantially as shown, for rotating said eccentric and moving the same laterally.

3. In combination with the lens-block, the grinding-shell, a pitman to move the shell, an eccentric and crank to actuate the pitman, and independently-driven mechanism for moving the first-named shaft endwise, whereby the course of the shell over the lenses may be varied by changing the relative speeds of the shaft.

4. In combination with the lens-block, the grinding-shell, the shell-operating pitman, the eccentric to move the same, the driving-shaft eccentric, and an intermediate clutch mechanism whereby the shell may be stopped without arresting the motion of the shaft.

5. In combination with the laterally and longitudinally reciprocating pitman, the pin or finger having a spherical end, a grinding-shell having a corresponding socket to receive the pin, and the cylindrical block on which the shell is loosely mounted, whereby the shell is moved by the pitman, but permitted entire freedom of motion on the block.

6. In combination with the grinding-shell, its actuating-pitman, the eccentric carrying said pitman, the driving-disk, the driving-pin, its actuating-spring, and the trip-pin mounted in the pitman and movable at the will of the operator.

7. In a lens-grinding machine, and in combination with the removable lens-block, the support having the longitudinal and transverse ribs to receive the block.

In testimony whereof I hereunto set my hand, this 3d day of December, 1889, in the presence of two attesting witnesses.

WILLIAM BAUSCH.

Witnesses:
JAMES J. ALLEN,
C. D. KIEHEL.